Figure 1:
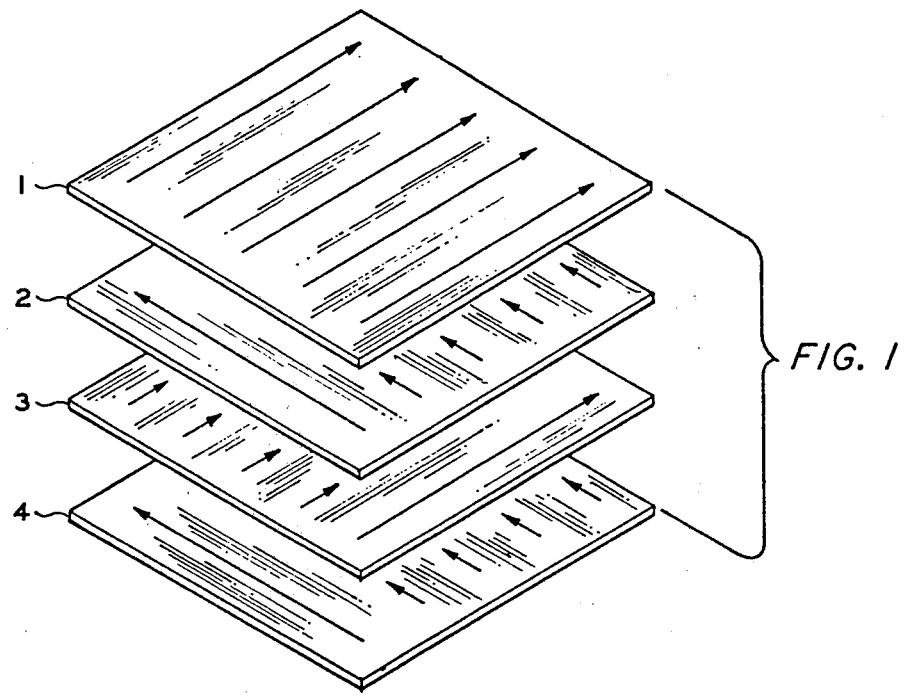

United States Patent [19]

Holmes

[11] 4,309,487

[45] Jan. 5, 1982

[54] LAMINATED ARMOR

[75] Inventor: Richard R. Holmes, Guntersville, Ala.

[73] Assignee: Phillips Petroleum Co., Bartlesville, Okla.

[21] Appl. No.: 282,301

[22] Filed: Aug. 23, 1972

Related U.S. Application Data

[63] Continuation of Ser. No. 754,966, Aug. 23, 1968, abandoned.

[51] Int. Cl.$^3$ ................................................ B32B 7/02
[52] U.S. Cl. ................................. 428/516; 428/910; 428/911
[58] Field of Search ............. 89/36 A; 2/2.5; 109/80; 161/55, 59, 253, 402, 404, 405; 428/516, 910, 911

[56] References Cited

U.S. PATENT DOCUMENTS

| | | | |
|---|---|---|---|
| 2,399,184 | 9/1941 | Heckert | 2/2.5 |
| 3,218,224 | 11/1965 | Osborn | 161/253 |
| 3,322,613 | 5/1967 | Rasmussen | 161/402 |
| 3,415,710 | 12/1968 | Arnold | 161/55 |
| 3,439,865 | 4/1969 | Port et al. | 161/402 |
| 3,508,944 | 4/1970 | Henderson et al. | 161/402 |
| 3,519,529 | 7/1970 | Cook | 89/36 A |
| 3,616,168 | 10/1971 | Johnstone | 161/402 |

*Primary Examiner*—Stephen C. Bentley

[57] ABSTRACT

An armor structure is provided by laminating multiple units consisting of one or more ply of unidirectionally oriented polyolefin film or fibers which are positioned so that the lines of orientation of adjacent units are at angles to each other. The armor structure can either be used alone or in combination with other armor materials. Bonding of the plies is achieved solely through the application of heat and pressure to the composite of positioned plies.

20 Claims, 2 Drawing Figures

LAMINATED ARMOR

BACKGROUND OF THE INVENTION

This application is a continuation of copending application Ser. No. 754,966, filed Aug. 13, 1968, now abandoned.

This invention relates to laminated armor and to a process for the production of same.

Although metal plates such as those made of steel have generally been considered outstanding as armor plate material, for some purposes such plate material is undesirable due to the considerable weight involved and lack of flexibility when used in sufficient thickness to afford adequate protection. In addition, utilization of metal armor plate suffers from the further problem that when struck by high-velocity bullets or metal fragments, there occurs severe secondary damage caused by disintegration of the metal plate or bullet into numerous fragments. There is thus presented an urgent need for a lightweight armor structure which can be used for vehicles such as boats or airplanes and the like, as well as for personal armament.

THE INVENTION

It is therefore an object of this invention to provide a lightweight armor structure capable of stopping bullets and shell fragments.

It is a further object of the present invention to provide lightweight armor comprising a metal plate combined with a structure which will diminish damage due to fragmenting of the metal plate.

A still further object of this invention is to provide a process for the formation of laminated armor having a plurality of plies therein which are bonded together without having to utilize additional adhesive materials in combination with each of the plies thereof.

Other objects, aspects and the several advantages of this invention will be apparent from the following specification, drawings, and claims.

In accordance with this invention there is provided a lightweight armor structure having high impact resistance and high resistance to shattering. The armor structure of this invention is formed by bonding composite units of oriented synthetic linear olefin polymer film or fibers which are positioned in such a manner that the lines of orientation of each adjacent unit are at angles to each other.

As used herein the term "ply" is intended to cover a single sheet of unidirectionally oriented olefin polymer film or a single layer composed of a plurality of unidirectionally oriented olefin polymer filaments in which the direction of orientation of each filament forming the layer thereof is the same.

The term "unit" as used herein is intended to cover a single composite of filaments or film having one or more ply therein and which is characterized by the fact that the direction of orientation of each ply therein is the same.

The synthetic linear olefin polymers used in the present invention are solid, high molecular weight products or mixtures thereof which are capable of being formed into filaments or films which can ge drawn to a high percentage of elongation. Drawing of the film or filaments can be accomplished by passing same through a heating zone wherein the film or filament is exposed to an elevated temperature which is below the temperature at which the material becomes molten for a sufficient time to heat same above its ambient temperature and render same orientable upon elongation so as to obtain fibers or films showing characteristic, molecular orientation along the fiber axis of the filaments or along the direction of the draw in the plane of the films. However, any means for achieving orientation of the film or filaments can be used in forming the oriented material to be used in formation of the armor structure of this invention.

The film or fibers should be highly oriented. Such orientation is achieved by drawing the film or filaments of which the laminate is to be constructed at a draw ratio of 6:1 to 20:1, preferably 9:1 to 14:1.

Olefin polymers which are suitable for forming the films or filaments to be used in the formation of the armor structure of this invention are those solid, orientable polymers formed by the polymerization of at least one monoolefin having from 2 to 8 carbon atoms therein. Such polymers include polyethylene, polypropylene, poly(1-butene), ethylene-1-butene copolymers, ethylenepropylene copolymers and the like, as well as blends or mixtures thereof. Such polymers are well known in the art and can be produced, for example, in accordance with the process of Hogan and Banks as set forth in U.S. Pat. No. 2,825,721. It should, however, be understood that the process for producing the synthetic linear olefin polymers from which the film and filaments of this invention are formed is not critical and they can be produced by any process which will provide a solid polymeric composition which is capable of achieving the degree of elongation as hereinafter defined.

In one embodiment of the invention the oriented olefin polymer film employed in forming the units of the laminate is a self-bonding, oriented polypropylene film which will retain its orientation when bonded by the application of heat and pressure.

In a preferred embodiment of this invention the oriented film which is utilized in forming the plies of the laminate is formed from a blend of 99 to 75% by weight of polypropylene and 1.0 to 25% by weight of polyethylene.

Each unit used in the formation of the laminate armor structure will generally contain from 1 to 100 plies or sheets of oriented olefin polymer film, preferably from 2 to 40 sheets, wherein the direction of orientation of each ply is the same and wherein each ply has a thickness of 0.5 to 25.0 mils.

In the formation of the armor structure the adjacent units of oriented film can be placed in any configuration so long as the direction of orientation of each unit differs. Preferably the direction of orientation differs 90° but a lesser angular difference can be employed.

The total thickness of the laminated armor structure of this invention is dependent upon the end use to be made of the laminate and the desired protection to be provided. Thus, for example, a thickness of 0.073 inch of laminate is capable of precluding penetration when fired upon by a 38-caliber blunt-nose bullet as shown in Example I. Obviously, where higher velocity projectiles are to be precluded from total penetration a thicker composite of the armor structure will be required.

Bonding of the units consisting of one or more plies to form the desired armor structure is carried out by subjecting the composite of positioned units to compression at elevated temperatures. Due to the unique nature of the plyforming material, no additional adhesives or bonding agents are required in the formation of the desired laminate. The material or composite of units, after being positioned in the manner as herein described, is placed into a press and subjected to an elevated temperature below the softening point of the polymer composition at atmospheric pressure and to a pressure sufficient to achieve the desired lamination. Ordinarily a press plate temperature in the range of 50° to 200° C. is employed. The pressure at which the press is operated is in the range of 50 to 100,000 psi and preferably 1000 to 50,000 psi. However, both pressures and plate temperatures outside these ranges can be utilized in achieving bonding or lamination of the ply units although the above conditions for bonding are most suitable when utilizing conventional pressing apparatus.

The armor structure or laminate of this invention is useful apart from any other material. However, for convenience, such as in the formation of body armor, the laminate can be used in association with other materials. Such covering material can be glued or, for example, the laminate can be joined by compression to the laminate. In addition, a plurality of layers of individual laminates can be employed wherein the individual laminate is bonded to, encased by, or otherwise retained by supporting means such as fiberglass, fabric, plastics and the like.

When used in association with other armor-providing materials such as metal or ceramic plate, the laminate may be directly bonded to the metal fastened thereto or simply retained in association therewith. The bonded laminate can be produced by gluing same to the metal plate or by joining thereto by pressure and heat as in the laminating of the polymer sheets to each other.

In another aspect of this invention, unidirectionally oriented film or filaments are woven into mats with the direction of the orientation of the warp being different from that of the direction of orientation of the filler. Weaving of the oriented film or filaments can be carried out in any conventional manner. The resulting woven material is then bonded and thereafter utilized in the same way as the previously described ply units.

The term "filament" as used herein is intended to include monofilament or multifilaments of olefin polymer having a single direction of orientation. Such filaments generally have an aspect ratio in the range of 1:1 to 20:1.

The armor structures of this invention have varying degrees of clarity or light transmission depending upon the total thickness of the laminate. Thus, protective armor suitable for face plates, windows and the like where visibility or light transmission is required is provided by the instant invention.

The film or filaments used in the formation of the armor structure of this invention can be of the solid or foamed types which are known to the art. In addition, such film or filaments can contain a variety of additives such as pigments, fillers, UV stabilizers, fire-retardants, antioxidants, insect and rodent repellents and the like in varying amounts so long as the desired properties of the film or filament are not adversely affected.

Figure 2:
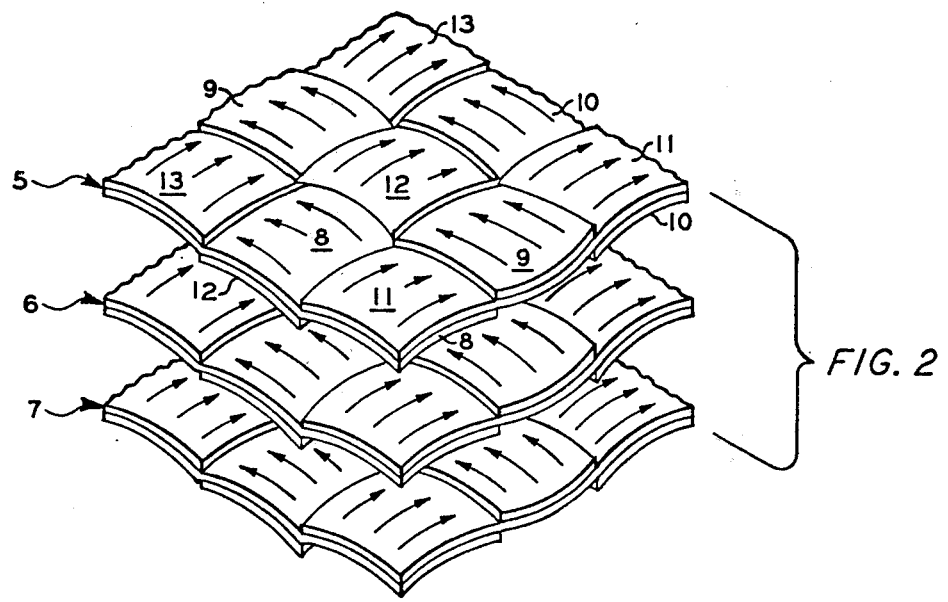

Referring now to the drawings, there is shown FIG. 1 which is an exploded view of one embodiment of this invention and FIG. 2 which is an exploded view of another embodiment of this invention.

With respect to FIG. 1, there is shown in an exploded view a lightweight armor structure comprised of units of crosslapped olefin polymers. For purposes of illustration only, four units designated by the numerals 1, 2, 3 and 4 are shown. As described elsewhere in the specification, the term "unit" as used herein is intended to cover a single composite of filaments or film having one or more ply therein and which is characterized by the fact that the direction of orientation of each ply in a unit is the same. Also as described herein, the term "ply" is intended to cover a single sheet of unidirectionally oriented olefin polymer film or a single layer composed of a plurality of unidirectionally oriented olefin polymer filaments in which the direction of orientation of each filament forming the layer is the same. Thus the direction of orientation of each unit is the same as the direction of orientation of the plies which form the unit. Units 1, 2, 3 and 4 shown in FIG. 1 have their direction of orientation indicated by the arrows drawn on each unit. It is noted that the arrows on adjacent units are at angles to each other, that is, the direction of orientation of adjacent units are not the same. Thus, as previously stated, in the formation of the armor structure the adjacent units of oriented film can be placed in any configuration so long as the direction or orientation of each adjacent unit differs. Preferably the direction of orientation differs 90° but a lesser angular difference can be employed. It is understood that FIG. 1 is an expanded view drawn for the purpose of illustrating the relationship between units in the structure. In an actual structure the units are not separated as they are shown to be in FIG. 1.

Regarding FIG. 2, there is shown an exploded view of another embodiment of this invention which, for purposes of illustration only, is indicated by woven mats 5, 6 and 7. As previously described in another aspect of this invention, unidirectionally oriented film or filaments are woven into mats with the direction of orientation of the warp being different from that of the direction of orientation of the filler. Accordingly, with respect to, for example, mat 5, the warp units 8, 9 and 10 are woven with filler units 11, 12 and 13 in such a fashion that the direction of orientation of the units of the warp are different from the direction of orientation of the units of the filler. Each unit consists of plies wherein the definition of plies and units is as previously described. The prepared mats are placed one on top of the other to form the completed structure.

The following detailed examples illustrate the preferred methods of producing armor plate and the like in accordance with the present invention. It is to be understood, of course, that the invention is not limited to the details set forth in these examples.

EXAMPLE I

A composite composed of oriented film tube of a blend of 95% polypropylene and 5% polyethylene, which had been flattened and drawn at a ratio of 14:1 so the wall thickness was approximately 0.6 mil, was prepared by alternately crosslapping the double sheets formed by the flattened tube at 90° using 122 single sheets or 61 double sheets. The resulting composite of the plurality of sheets was approximately 6 inches square. The film composite was then pressed at 20,000 pounds in a press having a plate temperature of 160° C. The resulting laminate was transparent and 0.073 inch thick. The laminate was then suspended in a rigid frame with a 4-inch-square target area showing.

The laminate was thereafter fired on at point-blank range by a 38-caliber blunt-nosed bullet. No penetration of the material occurred.

EXAMPLE II

A 2.0-inch-thick crosslapped laminate having a weight of 9.4 lbs. per square foot formed in the same manner described in Example I was placed adjacent to an armor plate formed of ⅛-inch stainless steel weighing 2.6 lbs. per square foot.

The metal-laminate combination was thereafter fired upon at 100 yards with a 30-06 armor piercing bullet. The bullet was stripped of its steel cover on passing through the steel plate and thereafter penetrated the 2-inch-thick laminate about 1 inch.

The above examples clearly demonstrate that the armor laminate of this invention is satisfactory for use in providing protection from high-velocity projectiles.

Reasonable variations and modifications of this invention can be made, or followed, in view of the foregoing disclosure, without departing from the spirit or scope thereof.

I claim:

1. A laminated armor structure capable of precluding penetration of bullets and shell fragments which comprises a plurality of bonded units wherein each of said units is so positioned that the directions of orientation of adjacent units are at an angle to each other and wherein the ply of each unit is formed from a member selected from the group consisting of unidirectionally oriented olefin polymer film and unidirectionally oriented olefin polymer filament, wherein the ply of each unit is positioned so that the direction of orientation of adjacent ply is the same and wherein said units are compression-bonded in the absence of adhesives or bonding agents.

2. A laminated armor structure according to claim 1 wherein said unidirectionally oriented olefin polymer film is self-bonding solid, oriented polypropylene film which will retain its orientation when bonded by the application of heat and pressure thereto.

3. A laminated armor plate according to claim 1 wherein the ply of each unit thereof is formed of a unidirectionally oriented olefin polymer film.

4. A laminated armor structure according to claim 3 wherein said unidirectionally oriented olefin polymer film is formed from a solid, orientable polymer formed by the polymerization of at least one monoolefin having from 2 to 8 carbon atoms therein.

5. A laminated armor structure according to claim 4 wherein said unidirectionally oriented olefin polymer film is formed from an olefin polymer film having been drawn at a ratio in the range of 6:1 to 20:1.

6. A laminated armor structure according to claim 4 wherein said unidirectionally oriented olefin polymer film is formed of an olefin polymer film having been drawn at a ratio in the range of 9:1 to 14:1.

7. A laminated armor according to claim 4 wherein said unidirectionally oriented olefin polymer film is formed from a polymer blend which contains from 1 to 25 weight percent of a solid polymer of ethylene and from 99 to 75 weight percent of a solid polymer of propylene.

8. A laminated armor structure according to claim 1 wherein each of said units contains from 1 to 100 ply of a unidirectionally oriented olefin polymer film or filaments and wherein each of said ply is of a thickness of 0.5 to 25.0 mils.

9. A laminated armor structure according to claim 1 wherein the total thickness thereof is at least 0.073 inch.

10. A laminated armor plate according to claim 1 wherein the ply of each unit thereof is formed of a plurality of unidirectionally oriented olefin polymer filaments so positioned that the direction of orientation of each filament is the same.

11. A laminated armor structure according to claim 10 wherein said unidirectionally oriented olefin polymer filament is formed from a solid, orientable polymer formed by the polymerization of at least one monoolefin having from 2 to 8 carbon atoms therein.

12. A laminated armor structure according to claim 11 wherein said unidirectionally oriented olefin polymer filament is formed from an olefin polymer filament having an aspect ratio in the range of 1:1 to 20:1.

13. A laminated armor structure according to claim 1 wherein each of said units is formed of a plurality of woven ply.

14. A laminated armor structure according to claim 13 wherein the direction of orientation of the units of the warp is different from the direction of orientation of the units of the filler.

15. The laminated armor structure of claim 14 wherein the ply of each unit thereof is formed of a plurality of unidirectionally oriented olefin polymer filaments so positioned that the direction of orientation of each filament is the same.

16. The laminated armor structure of claim 15 wherein said unidirectionally oriented olefin polymer filament is formed from a solid, orientable polymer formed by the polymerization of at least one monoolefin having from 2 to 8 carbon atoms therein.

17. The laminated structure of claim 16 wherein said unidirectionally oriented olefin polymer filament is formed from an olefin polymer filament having an aspect ratio in the range of 1:1 to 20:1.

18. The laminated armor structure of claim 16 wherein said unidirectionally oriented polymer filament is formed from a polymer blend which contains from 1 to 25 weight percent of a solid polymer of ethylene and from 99 to 75 weight percent of a solid polymer of propylene.

19. A laminated armor structure according to claim 1 wherein each of said units contains at least two plies.

20. A laminated armor structure according to claim 19 wherein each of said units contains from 2 to 40 plies of a unidirectionally oriented olefin polymer film or filaments.

* * * * *